ABL# UNITED STATES PATENT OFFICE.

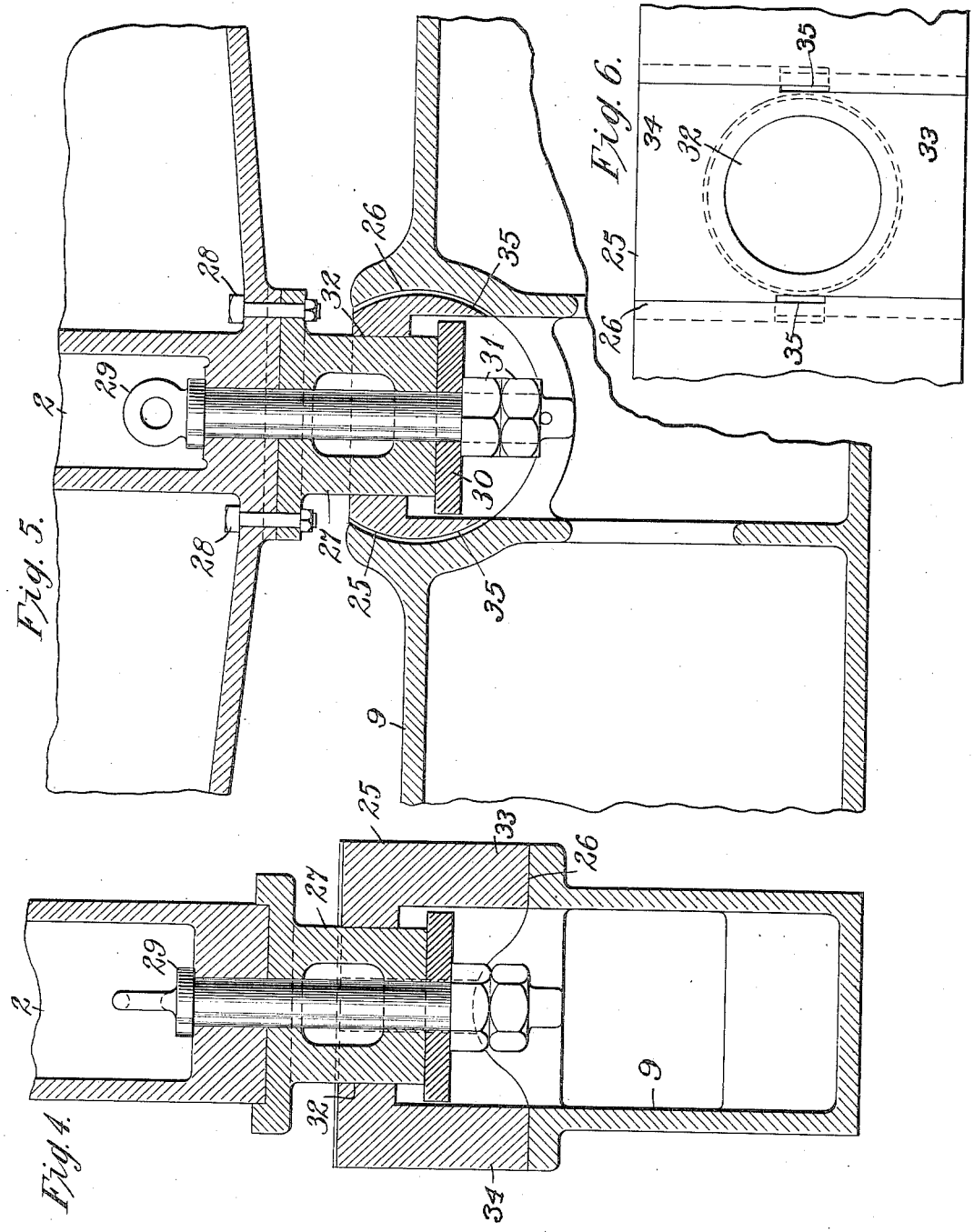

GEORGE M. EATON, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRIC LOCOMOTIVE.

1,067,325.　　　　　Specification of Letters Patent.　　Patented July 15, 1913.

Application filed November 8, 1909. Serial No. 526,801.

*To all whom it may concern:*

Be it known that I, GEORGE M. EATON, a citizen of the United States, and a resident of Wilkinsburg, in the county of Allegheny and State of Pennsylvania, have invented a new and useful Improvement in Electric Locomotives, of which the following is a specification.

My invention relates to railway vehicles and it has special reference to locomotives which are provided with two articulated trucks and electric driving motors.

One object of my invention is to provide a yielding connection between the two articulated trucks which shall be simple and durable in construction and adapted to absorb the shocks to which the parts would otherwise be subjected in operation.

Another object of my invention is to provide a particularly advantageous connection between one of the articulated trucks, of a locomotive of the class indicated above, and the vehicle body, whereby said truck may be capable of rotating on its pivot and, at the same time, be capable of a longitudinal adjustment relative to the vehicle body.

In Patent No. 1,036,811, granted August 27th, 1912, to Westinghouse Electric & Manufacturing Company upon an application filed by me, is illustrated and described a coupling for two articulated half units of an electric locomotive which enables the leading half unit to act as a leading truck for the trailing half unit in either direction of operation.

In my present invention, I embody features which are of special advantage for a connection between the articulated trucks of a locomotive having a single body and I adapt the coupling in other respects to the use for which it was intended.

In addition to the foregoing, I provide a king pin structure for one of the trucks which, not only permits of a swiveling truck action, but also permits a to and fro motion of the truck and a rocking motion of the cab.

Figure 1:
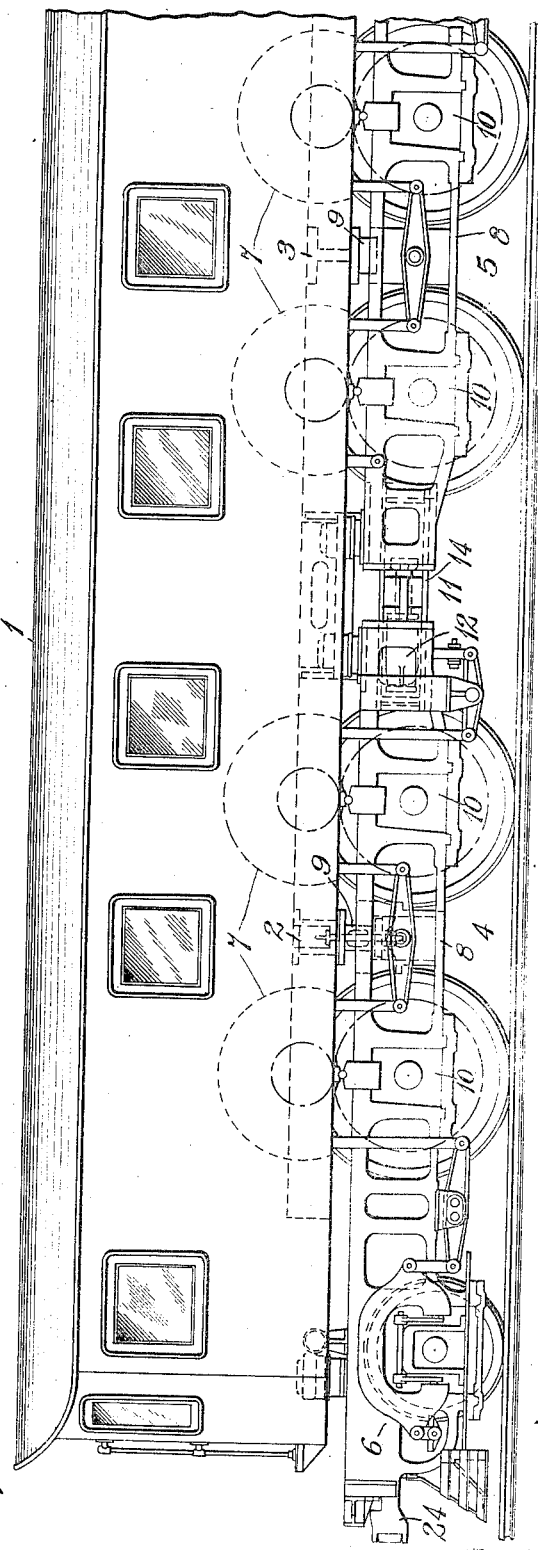
Figure 2:
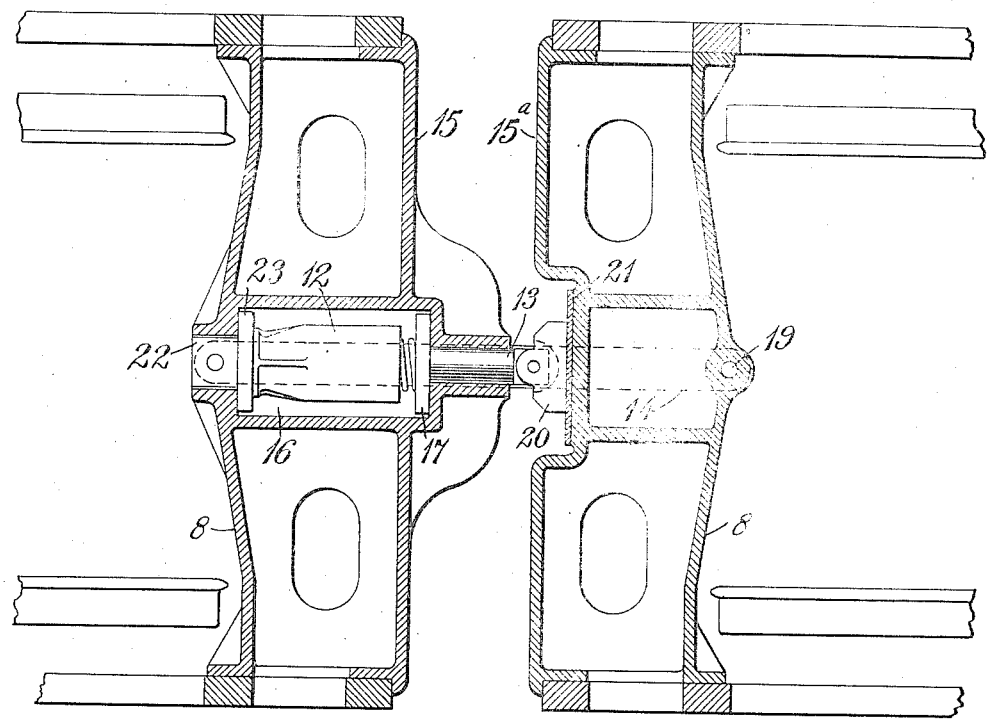
Figure 3:
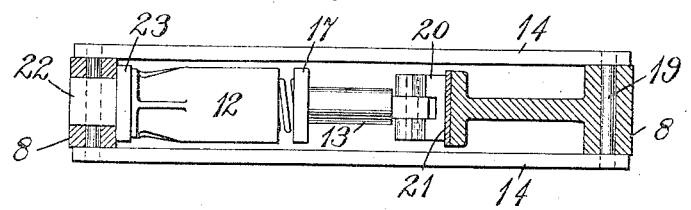

Figure 1 of the accompanying drawings is a side elevation of a portion of a locomotive embodying my invention. Figs. 2 and 3 are, respectively, a plan view, partially in cross section, and a side elevation of a coupling between trucks, Fig. 4 is a transverse vertical sectional view of the king pin connection for the locomotive shown in Fig. 1. Fig. 5 is a longitudinal vertical sectional view of the king pin connection and Fig. 6 is a detail plan view of certain of the parts shown in Figs. 4 and 5.

Referring to the drawings, the locomotive here shown comprises a body member 1, having body bolsters 2 and 3, two articulated driving wheel trucks 4 and 5 in which are incorporated pony trucks 6.

The vehicle body may be mounted on the trucks in any desired manner. In the case illustrated, all body weight is applied to the trucks through friction plates at the ends of the trucks, and no weight is carried on the center pins. Slight modifications, however, may be made within the scope of my invention to permit the weight to be carried on the center pins in the usual manner. Any desired proportion of the weight may be borne by the driving wheel axles of the trucks 4 and 5. Electric driving motors 7 (see Fig. 1) are mounted on the truck frames 8 and are yieldingly supported from the driving wheel axles by the equalizers and riding springs of the locomotive.

Each of the trucks 4 and 5 comprises, in addition to the truck frame 8, a truck bolster 9 and suitable journal boxes 10 in which the driving wheel axles are rotatably mounted. The truck 5 is capable of swiveling in the usual manner and any suitable king pin structure may be employed.

The truck 4 is coupled to the truck 5 by a yielding connection 11, and a special connection is provided between the body bolster 2 and the truck bolster 9 in order that the truck may be adjusted longitudinally with respect to the body 1.

The yielding connection or coupling 11, which is clearly illustrated in Figs. 2 and 3, comprises a friction draft gear 12 of any suitable character, a plunger 13 and a pair of links 14. The adjacent ends of the truck frames 8 are provided with particularly substantial girders 15 and 15ª, they being provided with a pocket 16 in which the friction draft gear 12 is disposed.

I deem it unnecessary to either illustrate or describe the friction draft gear in detail since such devices are well known to those skilled in the art.

The friction draft gear is compressed in the usual manner when it is inserted in the pocket 16 and it acts, at its ends, against follower plates 17 and 23 in the usual manner. The links 14 are pivotally connected at one end to a pin 19 which extends vertically through the girder 15ª in the central plane of the truck. The opposite ends of the links 14 are pivotally attached to a block 22 which is adjacent to the follower 23.

The outer end of the plunger 13 is provided with a shoe 20 which is pivotally attached thereto and engages a friction plate 21 on the girder 15ª, the arrangement of parts being such that the plunger and the shoe are disposed between the two links 14. The inner end of the plunger 13 abuts against the follower 17.

The non-adjacent ends of the trucks 4 and 5 are provided with standard draw bars 24 and the tractive effort is transmitted entirely through the truck frames.

When the locomotive is started with a load attached to the trailing truck, the two trucks tend to separate, thereby compressing the friction draft gear between the parts 17 and 23. When the locomotive is brought to rest, the momentum of the load attached to the trailing truck tends to force it against the leading truck but the resultant shock is absorbed by the friction draft gear.

The king pin structure between the truck bolster 9 and the body bolster 2 is shown on a relatively large scale in Figs. 4 and 5 and comprises a block 25 having a cylindrically curved bearing portion which is mounted in a cylindrically curved bearing 26 in the truck bolster 9; a cylindrical member 27 which is secured to the body bolster 2 by means of bolts 28 and projects downwardly therefrom, and a king bolt 29 which projects downwardly from the body bolster and longitudinally through the cylindrical member 27 and is provided, at its lower end, with a washer 30 and nuts 31.

The block 25 has a plane horizontal upper surface and it rests in the bearing 26 only at its ends, its central portion being hollowed out to receive the washer 30 and the nuts 31. The block 25 is provided with a hole 32 to receive the cylinder 27 in order that said parts may have relative rotative movement. One end 33 of the block 25 is slightly smaller in diameter than its end 34 and the bearing 26 is made to correspond, the parts being so proportioned, however, that a limited longitudinal adjustment of the block in the bearings is permitted (see space 35 in Figs. 4 and 6). This limit device is so disposed that, in case draw bars 14 are broken, the tractive effort is transferred from the truck frames to the cab structure, and truck 4 cannot be pulled out from under the locomotive.

It will be observed that the truck is free to swivel about the member 27 and may have a slight to-and-fro movement and that the body may be rocked from side to side without producing any bad effects on the king pin structure; at the same time there is no lost motion in the bearings themselves.

It is evident that modifications may be effected within the spirit and scope of my invention and I do not wish to be limited to the specific structures illustrated.

I claim as my invention:

1. In a railway vehicle, the combination with a body frame and a pair of articulated trucks upon which the frame is mounted, one of the trucks having a combined longitudinally and rotatably movable connection to the frame, of a yielding connection between the trucks which resists relative to-and-fro truck movements.

2. In a railway vehicle, the combination with a vehicle body, a pair of swivel trucks upon which the body is mounted, and a connection between one of the trucks and the vehicle body that permits a limited to-and-fro motion of the truck with respect to the body, of a yielding coupling between the trucks comprising centrally located draw bars which offer no resistance to bumping, and a reaction plunger which tends to hold the draw bars in tension.

3. In a railway vehicle, the combination with a body and a pair of trucks, a connection between one of the trucks and the body comprising a bearing block pivotally connected to the body and having a cylindrically curved under side supported in a similarly curved longitudinal seat on the truck frame, of a yielding connection between the two trucks.

4. In a railway vehicle, the combination with a body having a cylindrical projection and a pair of articulated trucks, of a connection between one of the trucks and the body comprising a bearing block journaled upon said cylindrical projection and having a cylindrically curved side longitudinally supported on the truck frame, whereby a swiveling and a to-and-fro motion of the truck are permitted.

5. In a railway vehicle, the combination with a body having a cylindrical projection and two trucks comprising wheel axles and frames having truck bolsters and a connection between one of said truck bolsters and the corresponding body bolster comprising a block pivotally mounted upon said cylindrical projection and having a cylindrically curved side movably seated in the truck bolster, whereby a swiveling and a to-and-fro motion of the truck with respect to the body is permitted, of a yielding connection between the two trucks comprising a pair of centrally located draw bars which offer no resistance to bumping and a re-action plunger disposed between them which tends to separate the trucks and to hold the draw bars in tension.

In testimony whereof, I have hereunto subscribed my name this 27th day of October, 1909.

GEORGE M. EATON.

Witnesses:
E. W. P. SMITH,
B. B. HINES.